(12) United States Patent
Knebel et al.

(10) Patent No.: US 10,877,254 B2
(45) Date of Patent: Dec. 29, 2020

(54) LIGHT SHEET MICROSCOPE FOR SIMULTANEOUSLY IMAGING A PLURALITY OF OBJECT PLANES

(71) Applicant: Leica Microsystems CMS GmbH, Wetzlar (DE)

(72) Inventors: Werner Knebel, Kronau (DE); Florian Fahrbach, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 124 days.

(21) Appl. No.: 15/744,877

(22) PCT Filed: Jul. 18, 2016

(86) PCT No.: PCT/EP2016/067033
§ 371 (c)(1),
(2) Date: Jan. 15, 2018

(87) PCT Pub. No.: WO2017/013054
PCT Pub. Date: Jan. 26, 2017

(65) Prior Publication Data
US 2018/0203217 A1 Jul. 19, 2018

(30) Foreign Application Priority Data

Jul. 17, 2015 (DE) .......... 10 2015 111 698
May 25, 2016 (DE) .......... 10 2016 109 717

(51) Int. Cl.
*G02B 21/00* (2006.01)
*G02B 21/16* (2006.01)
*G02B 21/36* (2006.01)

(52) U.S. Cl.
CPC ....... *G02B 21/006* (2013.01); *G02B 21/0032* (2013.01); *G02B 21/16* (2013.01); *G02B 21/361* (2013.01); *G02B 21/367* (2013.01)

(58) Field of Classification Search
None
See application file for complete search history.

(56) References Cited

U.S. PATENT DOCUMENTS 7,936,392 B2   5/2011 Ng et al.
2006/0241496 A1* 10/2006 Fengler .......... A61B 1/00009
                                                600/476

(Continued)

FOREIGN PATENT DOCUMENTS

EP   2244484 B1   3/2012
EP   2422525 B1   5/2014

(Continued)

OTHER PUBLICATIONS

Huisken J et al: "Even fluorescence excitation by multidirectional selective plane illumination microscopy (mSPIM)", Optics Letters, Optical Society of America, US, vol. 32, No. 17, Sep. 1, 2007 (Sep. 1, 2007), pp. 2608-2610, XP002508397.

(Continued)

*Primary Examiner* — Edemio Navas, Jr.
(74) *Attorney, Agent, or Firm* — Leydig, Voit & Mayer, Ltd.

(57) ABSTRACT

A light sheet microscope for simultaneous imaging of several object planes illuminated by a light sheet includes a camera and a detection optic defining a detection light beam between the light sheet and the camera. The object planes are arranged around the focal plane of the detection optic. The detection optic can include a microlens array.

24 Claims, 9 Drawing Sheets

(56) References Cited

U.S. PATENT DOCUMENTS

| | | | |
|---|---|---|---|
| 2008/0266655 A1* | 10/2008 | Levoy | G02B 21/361 359/368 |
| 2012/0281264 A1 | 11/2012 | Lippert et al. | |
| 2013/0176622 A1 | 7/2013 | Abrahamsson et al. | |
| 2014/0240559 A1* | 8/2014 | Ueno | H04N 5/335 348/294 |
| 2014/0263963 A1* | 9/2014 | Broxton | G02B 21/367 250/208.1 |
| 2014/0375776 A1* | 12/2014 | Abolbashari | G02B 27/005 348/49 |
| 2015/0177506 A1 | 6/2015 | Nishiwaki | |
| 2016/0048014 A1 | 2/2016 | Knebel | |
| 2018/0149854 A1* | 5/2018 | Siebenmorgen | G02B 21/082 |

FOREIGN PATENT DOCUMENTS

| | | |
|---|---|---|
| WO | WO 2014147261 A1 | 9/2014 |
| WO | WO 2016020684 A1 | 2/2016 |

OTHER PUBLICATIONS

Ober R J et al: "Simultaneous Imaging of Different Focal Planes in Fluorescence Microscopy for the Study of Cellular Dynamics in Three Dimensions", IEEE Transactions on Nanobioscience, IEEE Service Center, vol. 3, No. 4, Dec. 1, 2004 (Dec. 1, 2004), pp. 237-242, XP011122942.

Kayva Mohan et al: "Three Dimensional Fluorescence Imaging Using Multiple Light-Sheet Microscopy", PLOS One, vol. 9, No. 6, Jun. 9, 2014 (Jun. 9, 2014), p. e96551, XP055277114.

Partha Pratim Mondal, et al., "Efficient generation of diffraction-limited multi-sheet pattern for biological imaging", Optics Letters, vol. 40, No. 4, Feb. 15, 2015, pp. 609-612.

Robert Prevedel, et al., "Simultaneous whole-animal 3D-imaging of neuronal activity using light field microscopy", Nature Methods 11, Jan. 21, 2014, pp. 1-19.

Subhajit B. Purnapatra, et al., "Generation of multiple sheets of light using spatial-filtering technique", Optics Letters, vol. 39, No. 16, Aug. 15, 2014, pp. 4715-4718.

Christoph Skupsch, et al., "Multiple-plane particle image velocimetry using a light-field camera", Optics Express, vol. 21, No. 2, Jan. 28, 2013, pp. 1726-1740.

Michael Broxton, et al., "Wave optics theory and 3-D deconvolution for the light field microscope", Optics Express, vol. 21, No. 21, Oct. 17, 2013, pp. 25418-25439.

M. Levoy, et al., "Recordings and controlling the 4D light field in a microscope using microlens arrays", Journal of Microscopy, vol. 235, pt. 2, Apr. 7, 2009, pp. 144-162.

\* cited by examiner

LIGHT SHEET MICROSCOPE FOR SIMULTANEOUSLY IMAGING A PLURALITY OF OBJECT PLANES

CROSS-REFERENCE TO PRIOR APPLICATIONS

This application is a U.S. National Stage Application under 35 U.S.C. § 371 of International Application No. PCT/EP2016/067033 filed on Jul. 18, 2016, and claims benefit to German Patent Application Nos. DE 10 2015 111 698.7 filed on Jul. 17, 2015 and DE 10 2016 109 717.9 filed on May 25, 2016. The International Application was published in German on Jan. 26, 2017 as WO 2017/013054 Al under PCT Article 21(2).

FIELD

The invention is in the field of light sheet microscopy, and relates in particular to a light sheet microscope with which more information about an object can be obtained for a given light efficiency, or increased light efficiency can be made available for a given information content. The invention further relates to a method on the basis of said light sheet microscope.

BACKGROUND

Light sheet microscopy or light sheet fluorescence microscopy (LSFM), or single plane illumination microscopy (SPIM), is a fluorescence microscopy method in which only a thin layer (typically a few micrometers) in a sample is illuminated. This results in better resolution and appreciably decreased image background as compared with conventional incident- or transmitted-light fluorescence microscopy. Negative effects due to bleaching or light-induced stress in biological samples are furthermore diminished. Light sheet microscopy is used in cell biology, for fluorescence investigations of living organisms and, in the field of developmental biology, for long-term observations of embryo development in model organisms (developmental biology).

In a light sheet microscope, the plane to be detected is illuminated from the side with a thin light beam in the shape of a light sheet. As a result of diffraction, an unavoidable correlation exists between the thickness of the light sheet and its depth of focus. The "depth of focus" is to be understood in this context as the distance along the illumination axis over which the thickness of the light sheet remains approximately the same, or exceeds the thickness at the "waist" of the beam only by a factor of $\sqrt{2}$. This therefore also limits the maximum size of an object or objects that can be imaged with good image quality through the detection objective of the microscope and onto a sensor. Because the thickness of the light sheet directly determines both image contrast and the resolution along the detection axis, it should therefore be as thin as possible. It is desirable in particular for the thickness of the light sheet to be smaller than the depth of focus of the detection objective in order to avoid unsharp imaging of portions of the object. Many developers have therefore concentrated their efforts in recent years on reducing the (effective) thickness of the light sheet for a given depth of focus; this is only possible with considerable technical complexity, however, and moreover almost always results in greater sample stress due to the light sheet.

Figure 1A:
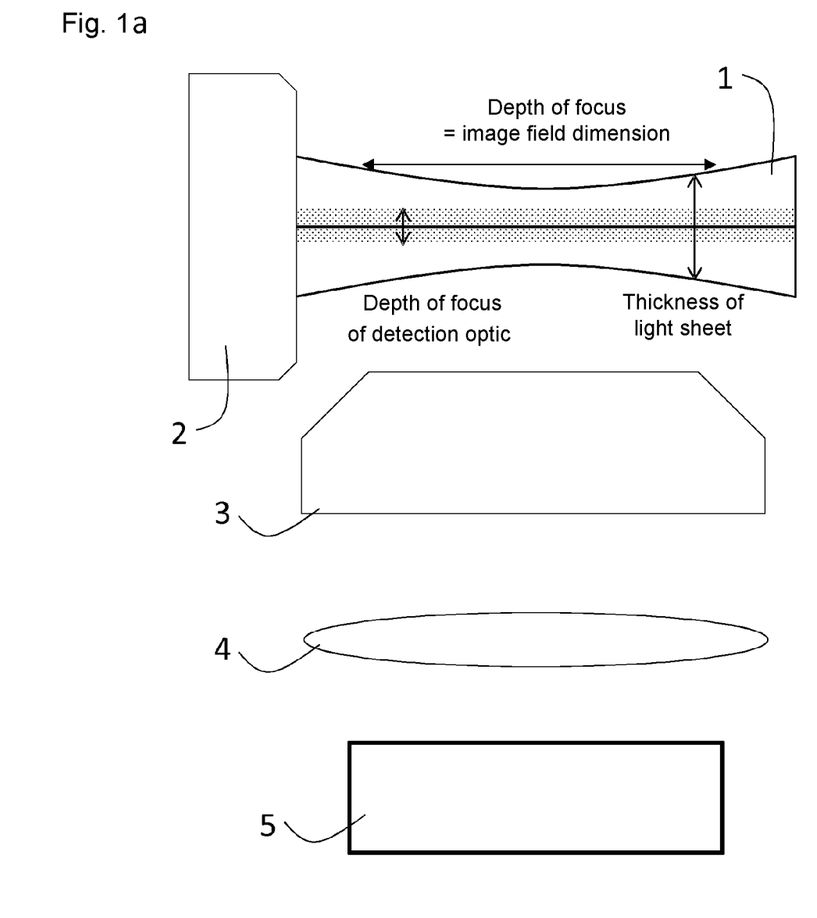
FIGS. 1a and 1b show the principle of a conventional light sheet microscope with a light sheet of different thicknesses.
Figure 1B:
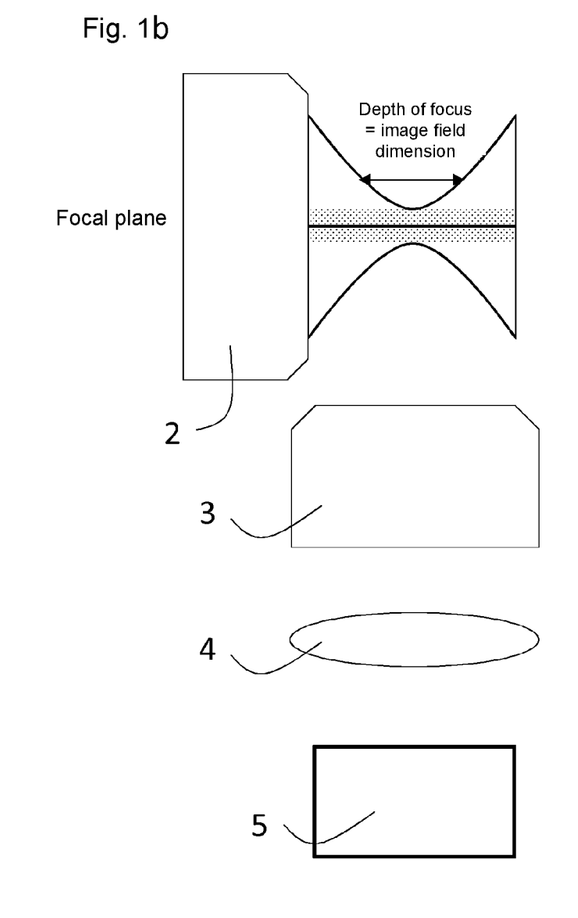

FIG. 1a shows a large sample that is being illuminated, through an illumination optic 2, with a light sheet 1 whose thickness exceeds the depth of focus of a detection optic 3. A portion of the illuminated region is therefore imaged via a tube lens 4 unsharply onto a camera 5. As shown in FIG. 1b, conversely, a thinner light sheet 1b results in a smaller depth of focus and a greater convergence and divergence, so that only smaller image fields can be viewed with higher resolution and higher contrast. One solution is to increase the depth of focus of the detection optic by stopping down (reducing the numerical aperture). The result, however, is that resolution is lost, in particular in the form of information regarding the position of objects along the detection axis, i.e. depth information.

The existing art regarding light sheet microscopy and microscopy related thereto is disclosed, for example, in the documents U.S. Pat. No. 7,936,392 B2, EP 2 244 484 Bl, EP 2 422 525 Bl, and US 2015/0177506A1. The following scientific publications are also part of this existing art:

Levoy, M., Zhang, Z. & McDowall, I. Recording and controlling the 4D light field in a microscope using microlens arrays. J. Microsc. 235, 144-162 (2009).

Broxton, M. et al. Wave optics theory and 3-D deconvolution for the light field microscope. pt. Express 21, 25418 (2013).

Skupsch, C. & Brucker, C. Multiple-plane particle image velocimetry using a light-field camera. Opt. Express 21, 1726-1740 (2013).

Prevedel, R. et al. Simultaneous whole-animal 3D imaging of neuronal activity using light-field microscopy. Nature Methods 11, 727-730 (2014).

P. P. Mondal, S. Dilipkumar and M. Kavya, Efficient Generation of Diffraction-Limited Multi-Sheet Pattern for Biological Imaging, Optics Letters, 40, 609-612 (2015).

S. B. Purnapatra, M. Kavya and P. P. Mondal, Generation of multiple sheets of light using spatial-filtering techniques, Optics Letters, 39, 4715 (2014).

SUMMARY

In an embodiment, the present invention provides a light sheet microscope for simultaneous imaging of several object planes illuminated by a light sheet. The light sheet microscope includes a camera and a detection optic defining a detection light beam between the light sheet and the camera. The object planes are arranged around the focal plane of the detection optic.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a light sheet microscope, and a method for operating it, which ensure particularly effective utilization of the excited fluorescence without reducing the thickness of the illumination beam and thus its depth of focus. A further advantage is to obtain as much depth information as possible regarding the object or objects.

In accordance an embodiment, the invention creates a light sheet microscope having a means for simultaneous imaging of several object planes, illuminated by means of a light sheet, by a camera, having a detection optic defining a detection beam path between the light sheet and the camera, the object planes being arranged around the focal plane of the detection optic.

In other words, an embodiment of the present invention draws upon light sheet technology, an optical means that furnishes object data simultaneously from several planes of an object being placed between a detection lens and a camera, from which data it is then possible to obtain, in a post-processing unit, sharp images of the several object planes that end up being located around the focal plane of the detection optic.

An embodiment of the present invention thus on the one hand achieves a significant increase in depth information for a given light efficiency, or an increase in light efficiency for a given quantity of depth information. On the other hand, simultaneous imaging of several planes is made possible; this is advantageous or in fact necessary for many dynamic processes, in particular if events in different planes are to be correlated with one another. The light sheet microscope according to an embodiment of the present invention thus allows simultaneous imaging of large volumes at increased speed and is thus particularly suitable for applications such as tracking of organelles in living cells and observation of extremely fast processes, in which serial scanning of the adjacent planes, for example by moving the object, the light sheet, and thus the detection objective synchronously, and/or internal focusing, is either impossible or undesirable.

Illumination of several mutually parallel object planes in a light sheet microscope using a spatial filter to generate the object planes is disclosed in P. P. Mondal et al. and in S. B. Purnapatra et al.

In the sector involving observation of living organisms several hundreds of μm in size, the light sheet technique has hitherto been used exclusively paired with wide-field illumination, e.g. by Prevedel et al. and by Broxton et al. Because of the wide-field illumination, the images of thick samples exhibit only very low contrast when the fluorescence in the object extends over several tens of times the depth of focus along the detection axis.

Alternative methods for synchronous imaging of several planes are, for example, multi-focus microscopy (MFM), which is described e.g. in US 2013/0176622 A1. With these methods, nine or 25 planes are imaged alongside one another onto one sensor. The optical system necessary for this is, however, far more complex than with light field microscopy. MFM is also based on transmitted light illumination or epifluorescence excitation. WO 2014/147261 describes the MFM method in combination with light sheet illumination.

US 2015/0177506 A1 describes a method that is related to the light field technique. This method utilizes illumination of the sample with a ray bundle from the side. The components coming from different spatial angles are filtered via a displaceable aperture diaphragm in the pupil of the detection objective. This has the disadvantage of sequential imaging of the various sample portions, whereas highly parallelized ("single shot") image acquisition is preferred in a light field microscope.

Skupsch et al. have presented an apparatus for particle imaging velocimetry (PIV) in which the sample is illuminated from the side with several light sheets through a cylindrical lens, and detection is carried out via a microlens array and reconstruction in accordance with the light field technique.

According to a particularly advantageous embodiment of the invention, provision is made that for simultaneous imaging of several object planes illuminated by means of a light sheet, a microlens array (MLA), which is preferably integrated into the camera, is arranged in the beam path between the detection optic and the camera. The microlens array is arranged with reference to the beam path at a distance in front of the camera. This distance is preferably at least a few pixels, and is a multiple of the focal length of the microlenses. The microlenses of the microlens array are furthermore larger than the pixel spacing.

According to an embodiment of the present invention, two different types of reconstruction can be utilized. The method to be used depends greatly on the selected position of the microlens array. The microlens array can be arranged in the image plane of the tube lens (TL) or at that point in the detection optic at which an image sensor (S) or a camera would be positioned for conventional image acquisition. The image sensor is then positioned at the distance equal to the focal length of the microlenses. This placement will be referred to here as "type A." The disadvantage of this method is that the pixel count (and thus the resolution) of the images of individual object planes scales as 1:1 with the number of microlenses. The number of pixels per image is therefore equal to the number of microlenses, and the number of resolvable planes scales with the ratio of the edge lengths of the pixels and microlenses. For example, five planes can be resolved if the edge length of a microlens corresponds to five pixels on the sensor.

Figure 8:
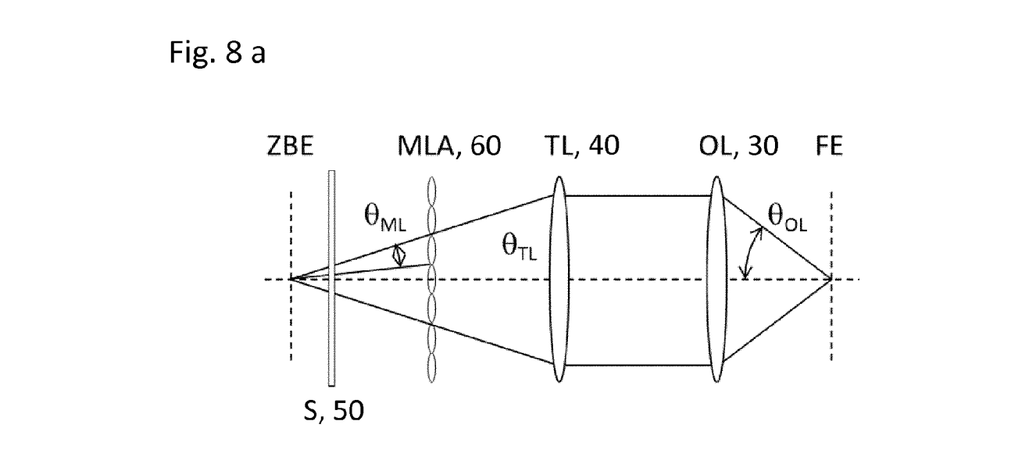
FIGS. 8a and 8b schematically illustrate the arrangement of a microlens array in an optical beam path.

Alternatively thereto, the microlens arrays can be positioned so that, together with the tube lens, they produce a telescope. The microlens array then images the (virtual) image of the tube lens onto the sensor as depicted in FIG. 8 ("type B"). Image reconstruction is effected using a correspondingly adapted reconstruction algorithm, which ascertains the position of the images of a point in the object in the images of several microlenses, and can calculate back therefrom to the position in the object, for example by triangulation and utilizing parallax. The Z resolution, and thus the number of resolvable planes, is determined in this case by the distance between the images of the same object point through different microlenses (base length for triangulation). A prerequisite for identifying an object point in the images of different microlenses is the availability of features of the object point which permit a correlation between the images of the individual microlenses, i.e. it must be possible to assign the several images of a point in the object to a point light source. In other words, based on the location on the sensor behind a microlens at which an object point is imaged, a linear region (or the region in the object volume of the point spread function [PSF] belonging to the microlens) along which the imaged object point can be located is defined. A second such linear region is defined by the position of the image of the same object point on the sensor behind another microlens. The object point must then therefore lie at the intersection of the two linear regions.

The focal length and the diameter or aperture value of the microlenses, and the location of the microlens array along the optical axis, are important aspects that principally influence the imaging quality. When type A is used, the aperture value of the microlenses ideally corresponds to the aperture value of the tube lens. With type B, it is the position of the microlens array relative to the sensor, and the diameter of the microlenses of the microlens array, which are principally important, as will be further explained later on. The distinguishability of object points (resolution of the optical system) depends on the spot size of the images of the object points on the sensor and their spacing. These values are determined by the focal length and diameter, or aperture value, of the microlenses, and the location of the microlens array along the optical axis.

Figure 9:
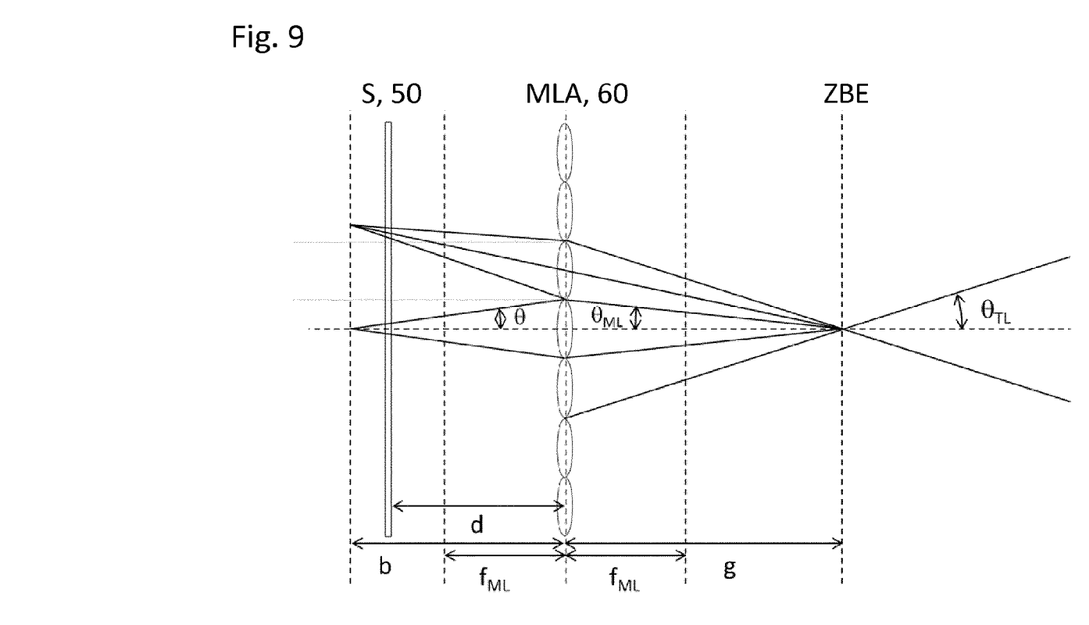
FIG. 9 schematically illustrates the arrangement of a microlens array in an optical beam path.

The diameters of the spot size, as a geometric approximation for a given microlens diameter v, microlens focal length $f_{ML}$, distance d of the sensor from the intermediate image plane (IIP) as a function of g, i.e. the distance of the intermediate image from the microlens array, is given by $$s=v(1-d/b)$$

where $1/f_{ML}=1/b+1/g$, i.e. $b=gf_{ML}/(g-f_{ML})$. The variables are identified in FIG. 9.

Changes in g result from the location Δz of the point light source in the object along the optical axis z with respect to the focal plane (FP) of the objective (OL), as $\Delta g=-M^2 \Delta z$, provided the values of Δz are small.

If the microlens array and the sensor are positioned so that the distance of the microlens array from the IIP corresponds approximately to $g_{opt}$, point light sources (PLS) in the focal plane are imaged sharply onto the sensor. Point light sources farther away are imaged less sharply with increasing distance dz from the focal plane, such that $dz=(g-g_{opt}) M^2$, or $$g=g_{opt}-dz\, M^2.$$

This approximation is sufficient in principle to ascertain the region in which a specific spot size on the sensor will not be exceeded; the validity limits of geometric optics must of course be taken into account.

In an embodiment, for example, the distance d between the microlens array and the sensor is selected so that objects in the focal plane of the objective are imaged sharply onto the sensor, i.e. so that for Δz=0 and Δg=0, a distance g between the intermediate image and the microlens array is obtained such that b=d, i.e. $d=g\, f_{ML}/(g-f_{ML})$. The sharpness of the image (the spot diameter s) then decreases (spot size s increases) if g is decreased or increased.

In a particularly advantageous exemplifying embodiment, d is selected so that $d=g\, f_{ML}/(g-f_{ML})$, where g defines an intermediate image plane that corresponds to a plane in the object which is somewhat closer to (for a Galilean telescope; FIG. 8a) or somewhat farther from (for a Keplerian telescope; FIG. 8b) the detection objective than the latter's focal plane. Planes that are located respectively somewhat farther from and somewhat closer to the objective are then located in a region with good resolution, and can be unequivocally reconstructed.

A fixed limit is represented, however, by the fact that g should only be decreased (or the absolute value of Δg should only be increased) to the point where g>f is still valid (especially in the case of a Keplerian telescope). Otherwise an unequivocal reconstruction becomes difficult due to the large spot size on the sensor. The resolution in this area is then also extremely poor.

A further important variable relates to the number of microlenses that image an object point, i.e. that subdivide the aperture of the objective along an axis transverse to the optical axis. This number is obtained from the quotient of the capture angle of the microlenses $\theta_{ML}=\arctan v/2g$ and the capture angle of the tube lens $\theta_{TL}=\arctan(d_{TL}/2/(f_{TL}-\Delta g))$, where d is the aperture of the tube lens. The spot size and the resolution on the sensor are independent of $\theta_{ML}/\theta_{TL}$, but the corresponding point spread function in the object volume is given approximately by $0.61\lambda/NA \times \theta_{ML}/\theta_{TL}$.

For objects in planes far away from the focal plane, or with a large Δz, the absolute value of Δg can become so large that $\theta_{ML} \ll \theta_{TL}$ and a very large number of microlenses image each object point, with the result that the signal in each individual image drops and resolution again becomes very low.

The significance of the above-described estimates in the context of the invention is that with light sheet illumination, in contrast to the illumination types hitherto used in this context (epifluorescence excitation), the thickness of the illuminated region can be coordinated exactly with the depth-of-focus region of the detection optic (or vice versa). Only those regions in which (a) unequivocal allocation is possible, and (b) maximum possible resolution is achieved, are therefore illuminated.

Condition (a) is achieved by the fact that object points whose intermediate image is located too close to the microlens array (g<f) are not illuminated. Reconstruction artifacts are thereby avoided. Condition (b) is achieved by illuminating only object points in a region located in such a way that the object points are respectively imaged only through a small number (for example, two or three) microlenses along an axis transverse to the optical axis (i.e. by approximately four to seven microlenses in total). As described above, this illuminated region should ideally also be limited, or adapted to the microlens array, in such a way that the spot size does not exceed an acceptable value, e.g. twice the minimum value.

According to the present invention, light sheet illumination is ideally suitable for the above-described advantageous selective and targeted illumination of a narrow region around the focal plane of the detected object.

It is appropriate in general to use two different types of microlens array, namely those that have only microlenses having a single focal length, also referred to in the present case as "homogeneous" arrays; and those having lenses having several different focal lengths, e.g. having three different focal lengths, also referred to here as "heterogeneous" microlens arrays. The advantage of using more-complex arrays having different microlenses is the greater resolution achievable in the reconstructed images, since the spot size on the sensor also depends on the focal length.

The present disclosure furthermore discusses advantageous beam profiles, which is novel in the context of combination with light sheet microscopy.

According to an advantageous embodiment of the invention, provision is made to introduce a microlens array in the detection beam path of a light sheet microscope between the detection optic and the camera, with the purpose of generating, by post-processing of the raw data acquired with the camera, images of several object planes that are arranged around the original focal plane of the detection optic. The microlens array can preferably constitute part of the light field microscope.

Advantageously, inter alia in order to ensure a high packing density of the microlenses and thus high resolution in the planes in which they end up being located, the centers of the microlenses of the microlens array are arranged on a rectangular or square grid, or alternatively on a hexagonal grid. In order to ensure a high packing density, the microlenses are arranged on a hexagonal grid. In a standard basis, however, the lenses are arranged on a square grid. The square grid is usual for a reconstruction in which the microlens array is located in the image plane, since it is then simpler to associate the light collected behind each microlens with a pixel in a "usual" image having square pixels. A hexagonal structure is preferred for the arrangement in which the microlens array performs imaging.

Advantageously, the detection optic of the microscope and the microlens array are designed and coordinated with one another in such a way that for an illumination beam having a full width at half maximum (FWHM) depth of focus of approximately 300 µm (corresponding to a numerical aperture≈0.06), images of three planes at a spacing of 2 µm, or images of five planes with a spacing of 1 µm, are generated by the camera. In the context of this invention it is ideal to use a combination of microscope detection optic and microlens array which generates, over a region of 4 µm, three to five individual images each having a depth of focus of 1 µm. Unlike in Skupsch et al., the depth of focus of the unit comprising the detection optic and microlens array is therefore considerably smaller than the dimension of the object (or of an object region of interest) along the detection axis. A combination having a shorter or longer depth of focus can also be used.

One problem with illumination using a beam having a Gaussian profile is that individual object planes along the illumination axis are not illuminated with uniform intensity, and adjacent planes are not illuminated with the same power level. In order to overcome this problem, according to the present invention means are provided for homogenizing the Gaussian profile of the illumination beam in such a way that the entire image field becomes illuminated with a beam profile that is substantially the same along the detection axis. Ideally, all the planes to be imaged are also illuminated with a substantially identical light intensity. An advantageous embodiment of the beam profile homogenizing means is constituted by a beam-shaping optical element, arranged in the illumination beam path, which is designed to impart to the illumination beam a top-hat profile whose width is selected in such a way that all the planes to be imaged are illuminated with substantially the same light intensity. Alternatively thereto, the beam profile homogenizing means provided is an optical element arranged in the illumination beam path, for example a TAG lens or an electrically tunable lens (ETL), which displaces the illumination beam axially back and forth at high frequency in such a way that all the planes to be imaged are illuminated with substantially the same light intensity. This is advantageous in particular on condition that the lateral profile along the illumination axis exhibits modulations that one wishes to compensate for or blur out.

An alternative imaging mode could also involve illuminating and synchronously detecting several planes that are farther apart from one another than would be necessary, at the effective depth of field of the detection objective (and microlens array), in order to scan along the detection axis in accordance with the Nyquist theorem. In this case an image stack could be acquired in such a way that the object is displaced, relative to the focal plane of the detection objective, in steps that permit Nyquist sampling but are smaller than the spacing of the planes detected in one step or for one position. The result is that while adjacent planes are no longer imaged simultaneously, fewer raw images are needed in order to allow large volumes to be imaged, so that the speed can be increased.

When light field cameras are combined with light sheet illumination, a clear advantage results from the fact that the depth of focus of the detection optic can be greatly increased. It is possible to synchronously image and illuminate planes whose spacing is appreciably greater than the depth of focus of the "normal" detection optic (objective alone, without a microlens array). Within this increased depth of focus, the light sheet can also be structured in order to enable better localization of the position along the detection axis.

Multiple planes can of course also be illuminated using beams other than Gaussian beams. As mentioned above, maximally flat beam profiles are advisable. Bessel beams and Bessel-like beams are also, however, alternative possibilities. Here the ring structure of the Bessel beams is adapted to the detection optic in such a way that each ring illuminates a different plane. Beams that, for example, generate a stripe pattern along the detection plane as an interference pattern of different sub-beams would be particularly desirable for illumination in this case. This can also be achieved, for example, by simple two-beam interference. It is particularly advantageous to use a Mathieu beam or a beam whose angular spectrum is made up of two oppositely located ring segments arranged symmetrically around the origin. The orientation of the ring segments is to be selected in such a way that a stripe pattern forms along the detection axis in the region around the optical axis of the illumination, with the goal of furnishing a beam shape that enables the various detected planes to be illuminated with maximum uniformity and, if possible, identical intensity.

Further areas of application of the light sheet microscope according to the present invention become accessible if the region of the depth of focus of the detection optic is illuminated by a light sheet that is appreciably thinner than the depth of focus of the detection optic. With this prerequisite, a means for generating the light sheet which is arranged in front of an illumination optic, and preferably encompasses a scanning minor, can advantageously be provided in order to move the light sheet, in steps or continuously, along the detection axis of the detection optic into mutually offset positions in such a way that different planes—selectably the focal plane and the respective object plane—are successively illuminated. As a result, the light sheet can be moved through a sample perpendicularly to the image field dimension; this is advantageous, for example, when scanning a biological sample that, for reasons including its stability, should not be moved in the course of investigation with the light sheet microscope.

According to a further advantageous embodiment of the microscope according to the present invention, the detection beam path is split, by a beam splitter configuration comprising a beam splitter, into a further detection path leading to the camera via the microlens array and a detection path that leads to a camera without interposition of a microlens array. This permits high-resolution imaging of the sample in the focal plane of the detection optic, in addition to imaging at relatively reduced resolution by means of the camera having the microlens array in front of it.

The beam splitter configuration for generating two detection paths can advantageously be designed, using mirrors, in such a way that the detection path having a microlens array, as well as the detection path not having one, are imaged next to one another onto the same camera. An embodiment of the invention furthermore provides a method for simultaneous imaging of several object planes illuminated by means of a light sheet using the light sheet microscope according to an embodiment of the present invention, in which object volumes of the light sheet structure are correspondingly detected and imaged in a layered fashion.

Instead of beam splitters, it is also possible to use hinged mirrors so that the beam path having a microlens array or the beam path having no microlens array can be used selectably. The two beam paths can also have different magnifications, for example as a result of different focal-length combinations of the lenses or by way of additionally integrated telescopes.

With this method, object volumes are advantageously imaged onto the camera successively in time by moving the detected object planes relative to the object.

Alternatively thereto, the object volumes are detected and imaged synchronously by simultaneously detecting several illuminated object planes that are farther apart from one another than would be necessary, at the effective depth of focus of the detection optic having no microlens array, in order to scan along the detection axis in accordance with the Nyquist theorem.

Advantageously, in order to image large object volumes, image stacks are detected and imaged in such a way that the object is displaced, relative to the focal plane of the detection optic, in steps that permit Nyquist sampling but are smaller than the spacing of the planes detected in one step for one position.

Advantageously, the light sheet microscope according to an embodiment of the present invention encompasses in the illumination beam path a scanning mirror with the aid of which the light sheet can be displaced along the detection axis. It is thereby possible to illuminate several planes in the sample successively in specific fashion, and to acquire an image with the camera for each position of the light sheet. In this case the microlens array is used in order to increase the depth of focus. Regardless of the position of the light sheet, the image of one or several object planes within the illuminated volume can be reconstructed from the data acquired by the sensor. What is critical in this application case is that the light sheet be appreciably narrower than the depth of focus of the detection optic that encompasses at least an objective, a microlens array, and preferably a tube lens.

The principle of a conventional light sheet microscope shown in FIGS. 1a and 1b has already been explained above.

Figure 2:
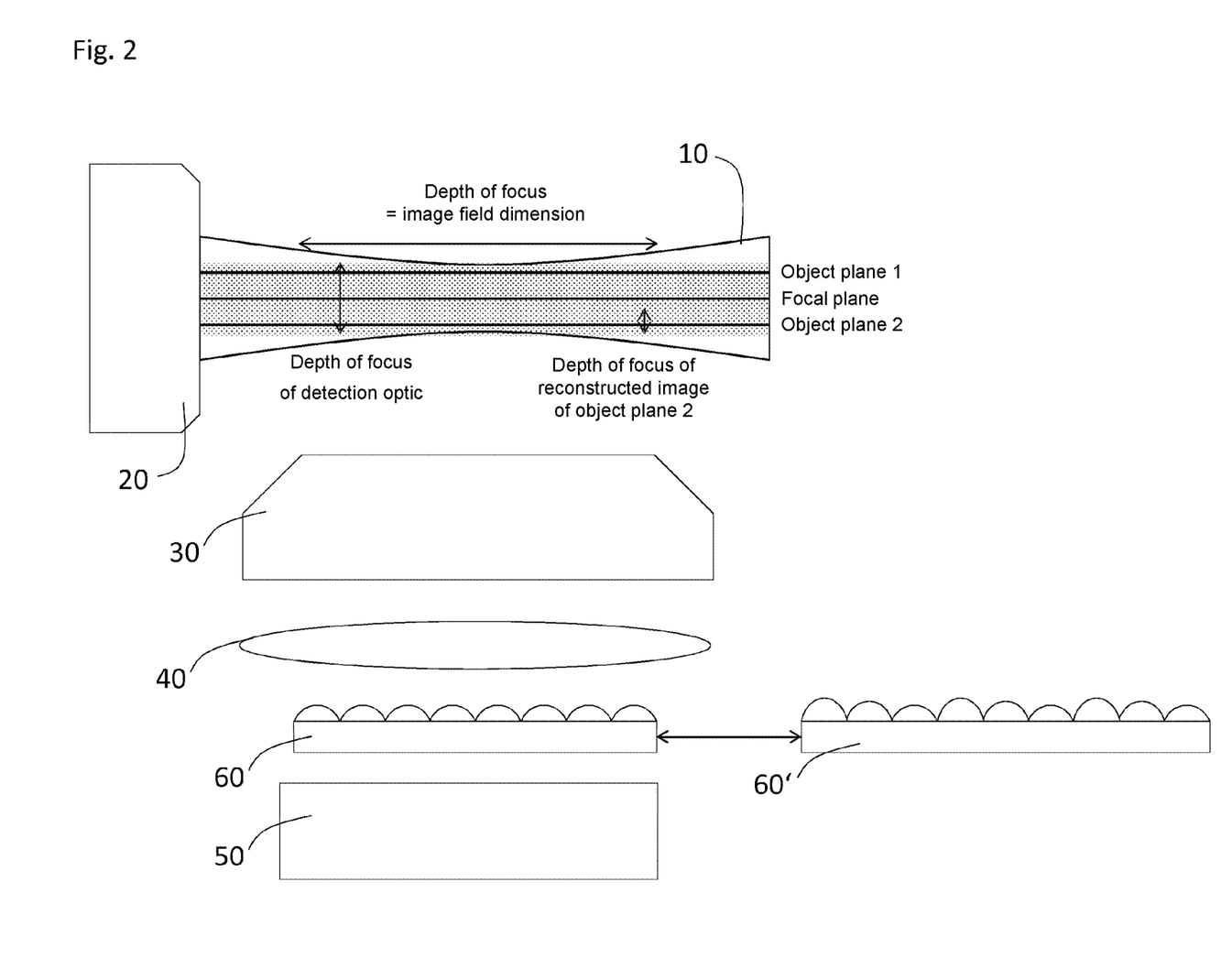
FIG. 2 shows the principle of the light sheet microscope according to an embodiment of the present invention.

FIG. 2 shows the principle of the light sheet microscope according to the present invention, which encompasses, like the microscope of FIGS. 1a and 1b, an illumination optic 20 to generate a light sheet 10, a detection optic 30 having a tube lens 40, and a camera 50 in the form of an area detector or sensor. The light sheet microscope additionally encompasses a microlens array 60 in the beam path between tube lens 40 and camera 50. Microlens array 60, which preferably is integrated into camera 50 with the result that the latter constitutes a light field camera, serves as a means for simultaneous imaging of several object planes (object plane 1, object plane 2), illuminated by means of light sheet 10, via detection optic 30 by means of camera 50, object planes 1 and 2 being arranged around the focal plane of the detection optic which, in conventional fashion, defines an object plane.

Microlens array 60, shown arranged in the beam path in FIG. 2, encompasses a plurality of microlenses having the same focal length, as schematically depicted by semispherical microlens bodies of identical size. Alternatively, a microlens array 60' that is shown in FIG. 2 arranged at an offset from the microlens array, and encompasses a plurality of microlenses of different focal lengths as schematically depicted by semispherical microlens bodies of different sizes, is used in the beam path between tube lens 40 and camera 50. The centers of the microlenses of microlens array 60, 60' are arranged on a rectangular or square grid, or alternatively on a hexagonal grid.

In the example shown in FIG. 2, detection optic 30 and tube lens 40 of the microscope, and microlens array 60, 60', are designed and coordinated with one another in such a way that for an illumination beam having a FWHM depth of focus of approximately 300 μm (corresponding to a numerical aperture≈0.06), images of three planes at a spacing of 2 μm are generated by the camera. Alternatively, by corresponding design of detection optic 30 and of microlens array 60, 60', images of five planes at a spacing of 1 μm, or 10 planes at a spacing of 0.5 μm, are generated.

Figure 3:
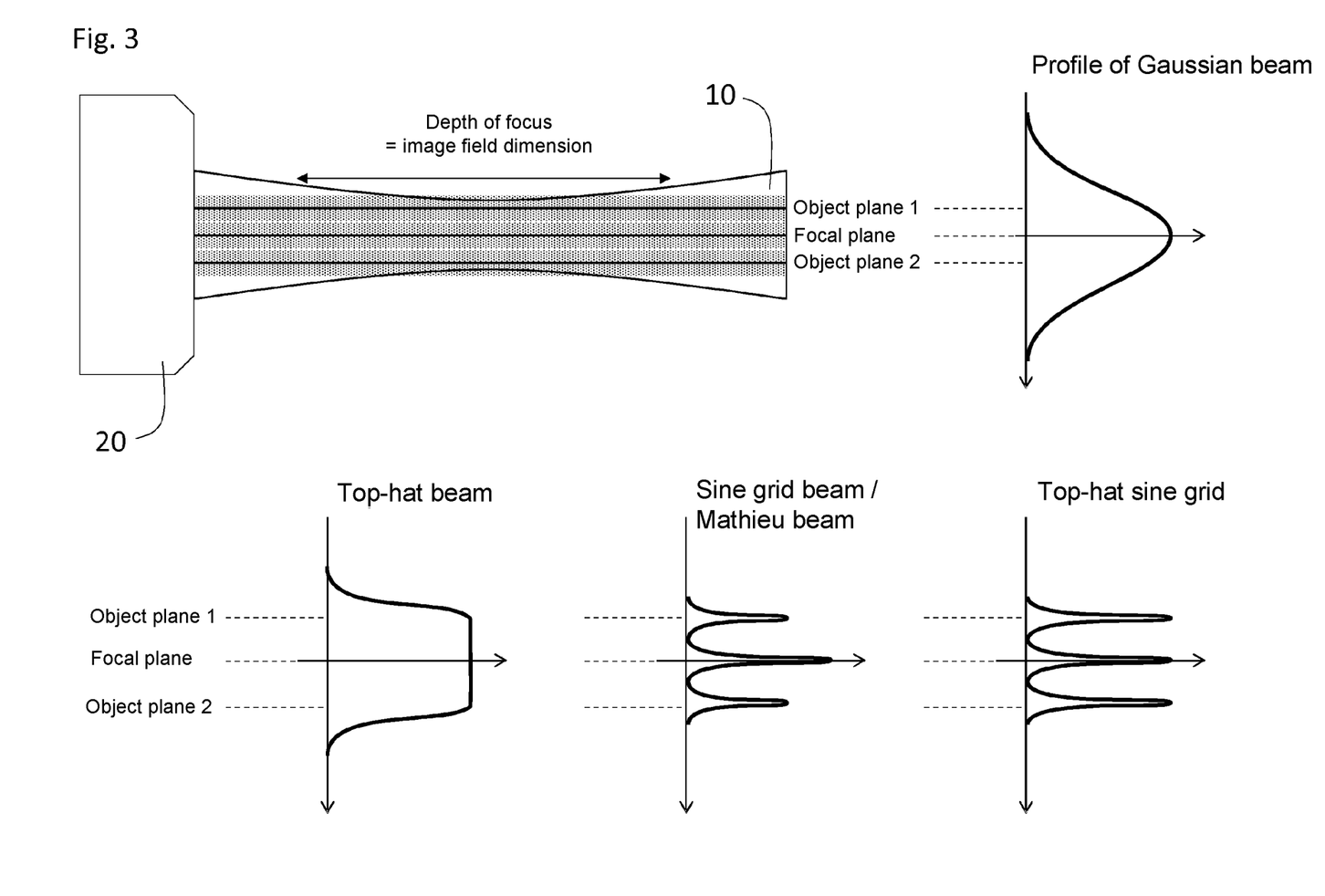
FIG. 3 shows different beam profiles of the illumination beam generated by the illumination optic of the light sheet microscope of FIG. 2.

FIG. 3 shows that, for the light sheet microscope of FIG. 2, the illumination beam generated by illumination optic 20 in the form of a light sheet 10 typically exhibits a Gaussian profile, with the result that the various object planes are illuminated with appreciably different intensities. In order to equalize those illumination differences as effectively as possible, means are provided for homogenizing the Gaussian profile of the illumination beam in such a way that all the planes that are to be imaged are illuminated with substantially the same light intensity.

The beam profile homogenizing means is a beam-shaping optical element, arranged in the illumination beam path, which is designed to impart to the illumination beam, originally having a Gaussian beam profile, a top-hat profile whose width is selected in such a way that all the planes to be imaged are illuminated with substantially the same light intensity at least in the center of the image field.

Alternatively, the beam profile homogenizing means can encompass an optical element, for example a TAG lens or an electrically tunable lens (ETL), which is arranged in the illumination beam path and axially displaces the illumination beam, continuously or in steps, in the illumination direction during the exposure time of the camera, in such a way that all the planes to be imaged are illuminated with substantially the same light intensity. Two beam profiles resulting therefrom, having a stripe pattern respectively having three beam maxima in the region of the object planes, are shown in FIG. 3 in the form of a sine grid/Mathieu beam profile and a top-hat sine grid beam. The corresponding stripe pattern, which ensures substantially equal-intensity illumination of the detection planes or object planes, can be generated, for example, by two-beam interference along the respective detection plane. The amplitude of the motion of the illumination beam is adapted either to the size of the image field or to the axial structure of the illumination beam which is to be blurred out. For example, if the beam has an intensity modulation along the illumination axis having a period p, the beam p is then displaced, for a modulation with a spatial limit frequency of k, by at least 1/k.

Figure 4A:
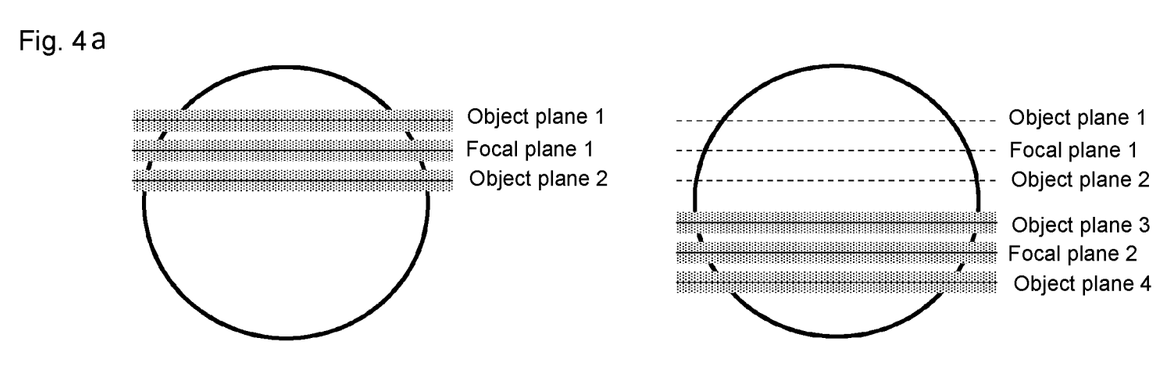
FIGS. 4a and 4b show images of three object planes generated with the camera of the light sheet microscope of FIG. 2 through its detection optic and its microlens array.
Figure 4B:
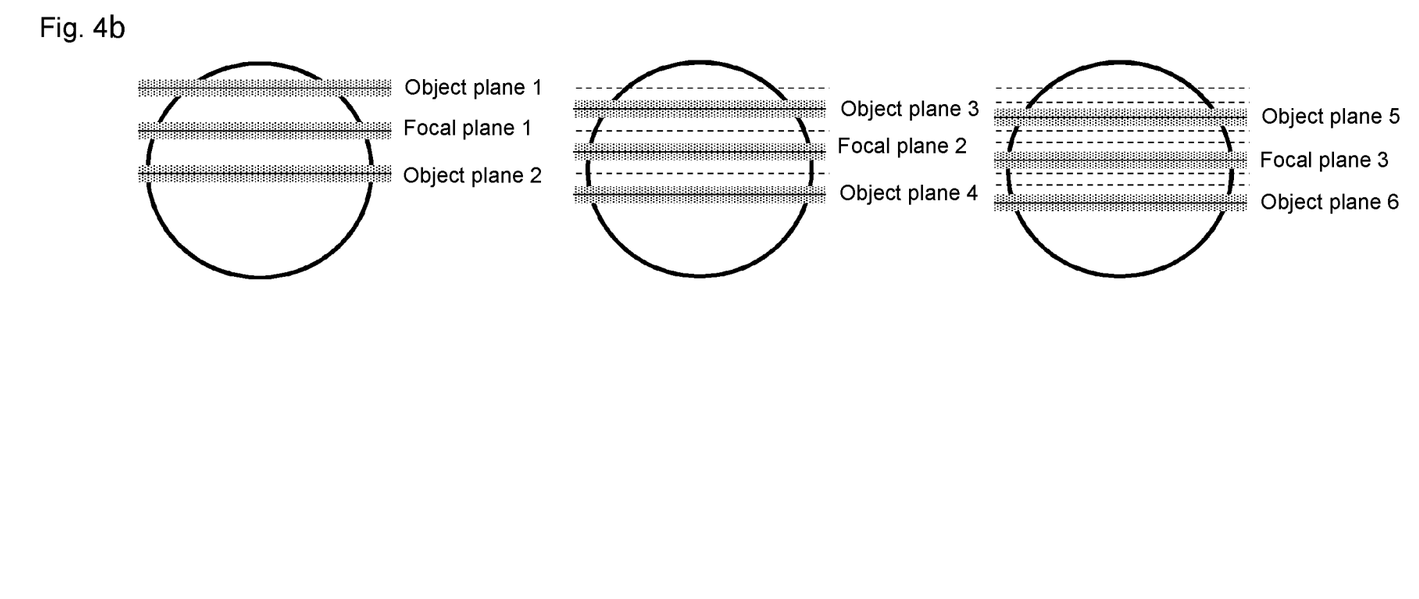

FIG. 4 shows images, generated with camera 50 of the light sheet microscope of FIG. 2 through detection optic 30 and microlens array 60, 60', of the three object planes (object planes 1 and 2 and the focal plane corresponding to the third object plane) in different locations and with different mutual spacings. These different object plane locations and spacings can be achieved by corresponding coordination and design of the detection optic and microlens array, and by adapting the reconstruction algorithm.

Figure 5:
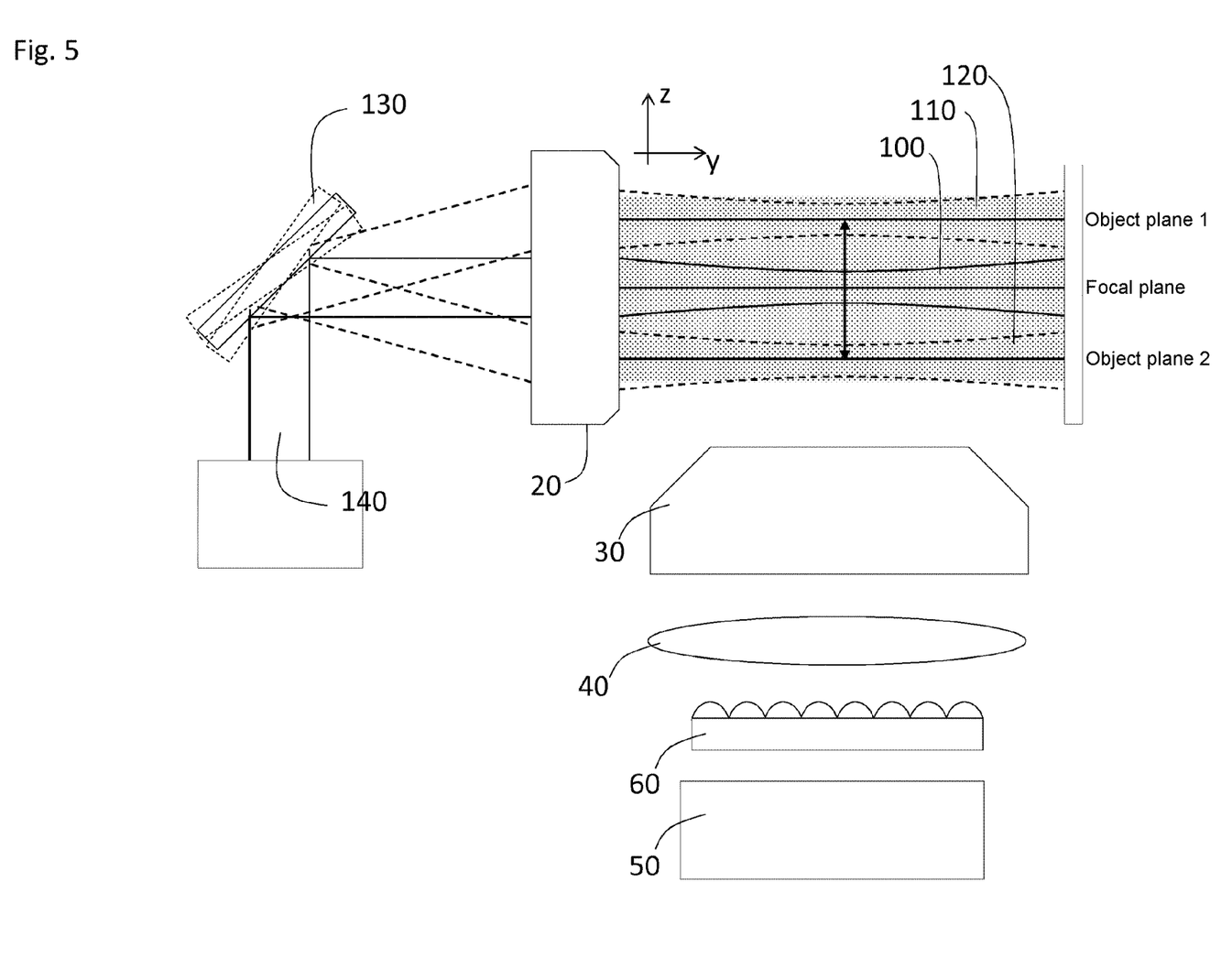
FIG. 5 shows an embodiment of the light sheet microscope according to the present invention with a light sheet that is movable through a sample perpendicularly to the image field dimension.

FIG. 5 shows an embodiment of the light sheet microscope according to the present invention which is designed to displace or offset the light sheet through a sample perpendicularly to the propagation direction Y. Such a procedure makes it possible, for example, to scan a biological sample that, for reasons including its stability, should not be moved in the course of investigation with the light sheet microscope.

With this embodiment of the light sheet microscope, the depth-of-focus region of the detection optic encompassing objective 30, tube lens 40, and microlens array 60 is illuminated by a light sheet that is appreciably thinner than the depth of focus of the detection optic. A means is provided for moving the thin light sheet along detection axis Z, in stepped or continuous fashion, into mutually offset positions 100, 110, 120 in such a way that different planes are successively illuminated, for example the focal plane in light sheet position 100, object plane 1 in light sheet position 110, and object plane 2 in light sheet position 130. This means encompasses an optical element for deflecting ray bundle 140 that generates the light sheet via illumination optic 20, which bundle passes, as a result of the deflection, through various points in illumination optic 20 along detection axis Z. In the embodiment of FIG. 5, the deflection element comprises a scanning mirror 130.

Camera 50 acquires images of the respective plane for the various light sheet positions 100, 110, 120 offset in the direction of detection axis Z. Ideally, the spacing between the planes corresponds to approximately half the beam width in order to conform to the Nyquist criterion. Larger steps are also possible in order to increase the volume size for a given speed, or to increase the speed for a given volume size.

In the case of the embodiment according to FIG. 5, post-processing does not primarily involve reconstruction of a 3D volume of a sample from a single image. In this case it is of course also possible to generate images of several object planes within the region illuminated by the thin light sheet, as described earlier. It is particularly advantageous in this context, however, that the illuminated region of the sample can be regarded approximately as a plane, and that a sharp image can be generated by the detection optic with no need to refocus the detection optic onto the illuminated plane. Information regarding the position of the light sheet can also be used for this purpose in order to assist reconstruction.

The motion of the light sheet along the detection axis can also occur continuously and during the exposure time of the sensor, so that a region that is thicker than the light sheet is effectively illuminated in the image acquired by camera 50. An advantage of this procedure is that the homogeneity with which the detected volume is illuminated can be enhanced.

In order to avoid broadening the effective thickness of the light sheet, however, the exposure time of the camera must be adapted to the scan speed at which the light sheet is shifted. For this purpose, the light sheet is displaced during the exposure time by an amount equal to only a fraction, preferably less than 10%, preferably less than 5%, of its thickness.

Figure 6:
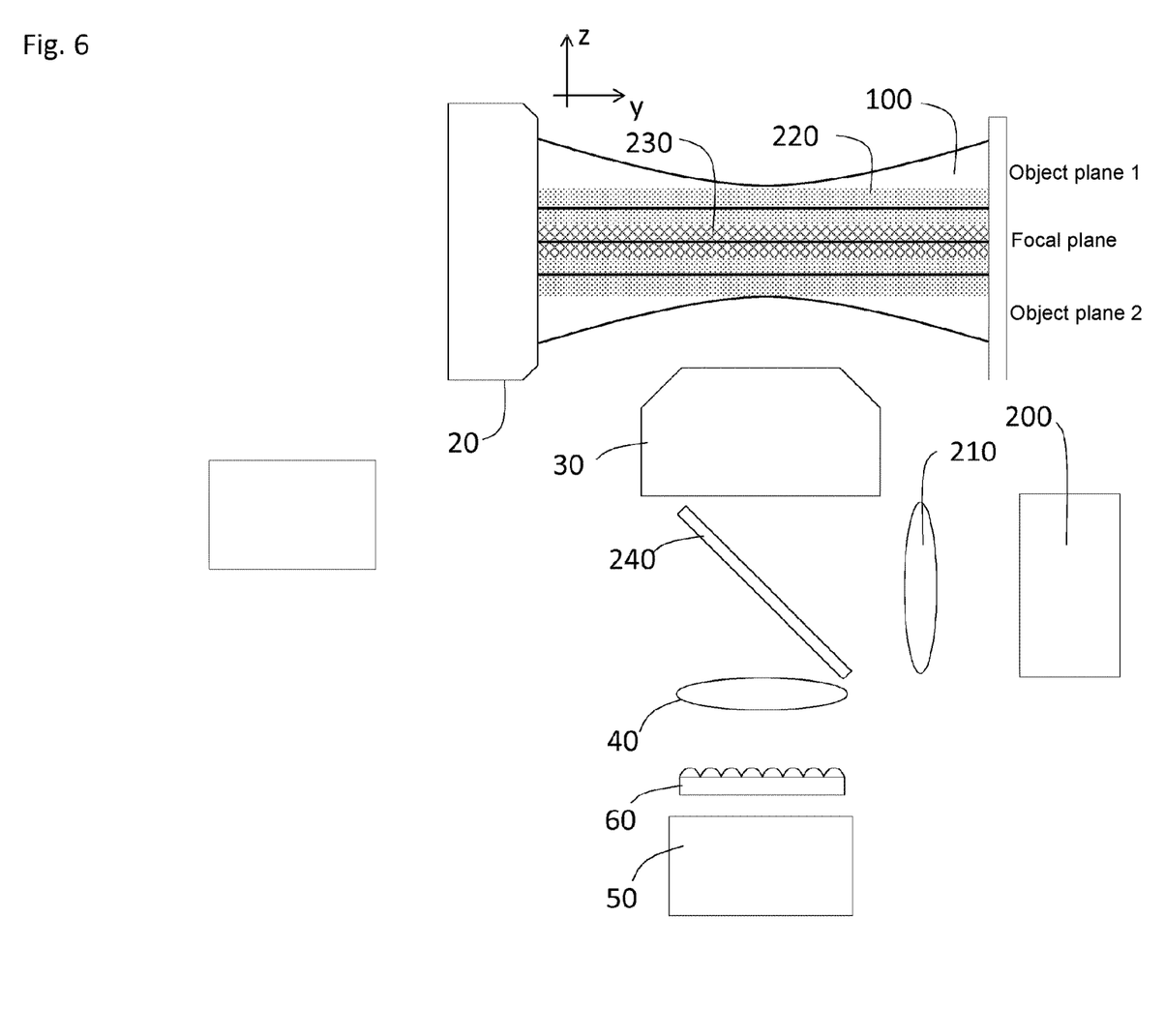
FIG. 6 shows an embodiment of the light sheet microscope according to the present invention having a beam splitter configuration, comprising a beam splitter or hinged mirror, in the detection beam path in order to generate two detection paths leading to different cameras.

FIG. 6 shows an embodiment of the light sheet microscope according to the present invention that, in addition to imaging of the various planes of a sample (focal plane, object plane 1, and object plane 2) at reduced resolution in accordance with the embodiments of the light sheet microscope shown in FIGS. 2 and 5 by means of camera 50 preceded by microlens array 60, permits high-resolution imaging of a single plane of the sample, for example the focal plane or one of the object planes.

For this purpose, the light in the detection beam path is split, by a beam splitter configuration comprising a beam splitter (240), into the detection path to camera 50 which encompasses the tube lens (40) and microlens array 60, and a detection path proceeding perpendicularly thereto which leads via a tube lens 210 to a camera 200 that is not preceded by a microlens array. Beam splitter 240 either can act in spectrally neutral fashion or can be configured as a dichroic short- or longpass filter or as a bandpass filter. It is also conceivable to embody beam splitter 240 as a movable hinged mirror, which directs the light either via lens 210 onto camera 200 or via lens 40 and microlens array 60 onto camera 50.

The depth-of-focus region of the detection path in the light sheet having no microlenses is labeled 230, while the depth-of-focus region of the detection path in the light sheet having microlenses is labeled 220.

Figure 7:
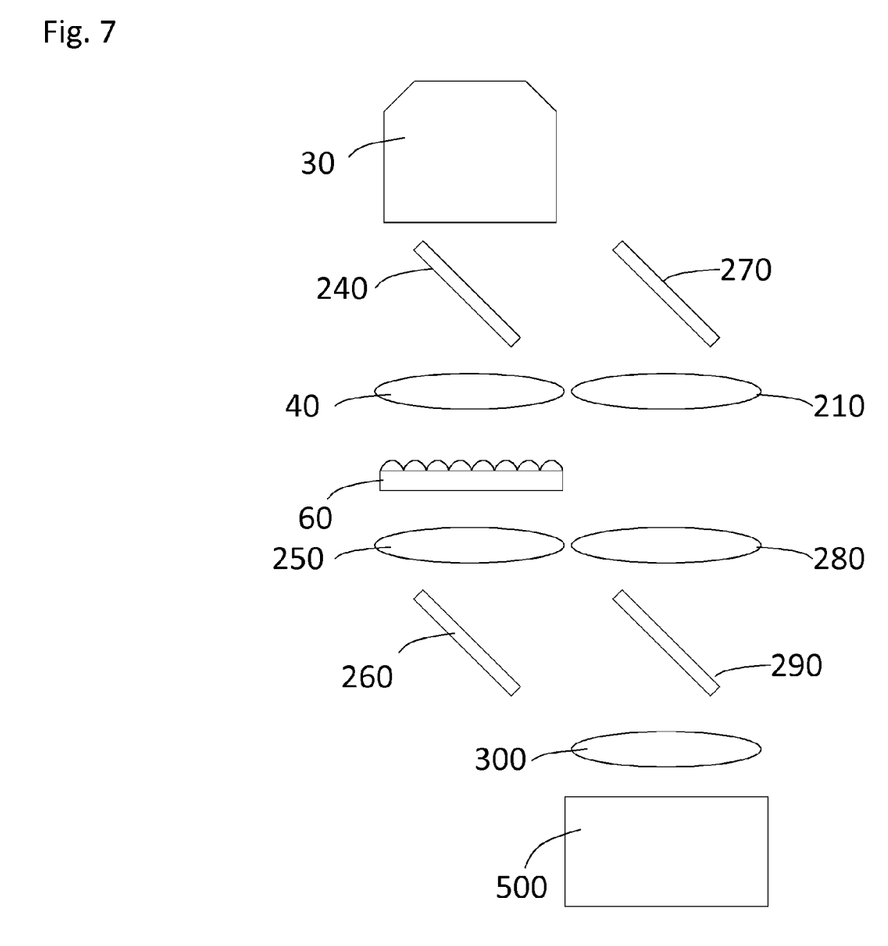
FIG. 7 shows an embodiment of the light sheet microscope according to the present invention having a beam splitter configuration, comprising a beam splitter or hinged mirror, in the detection beam path in order to generate two detection paths leading to the same sensor.

The beam splitter configuration of FIG. 6 can preferably be configured, as shown in FIG. 7, in such a way that the two partial beam paths are imaged onto one and the same sensor of a shared camera 500. The images generated by the two partial beams paths are preferably imaged onto the sensor next to one another, as is known in principle, for example, from two-color splitters. A microlens array is located, however, in at least one partial beam path. The microlens array must be arranged within the splitter in one partial beam path in a plane conjugated with the original location. As is evident from FIG. 7, this is achieved, proceeding from the beam splitter configuration of FIG. 6, by the fact that the second detection path not having a microlens array is deflected 90°, after beam splitter 240, in such a way that it extends parallel to the first detection path encompassing the microlens array. Located in the second detection path, following the beam splitter, are a first lens 210 and a second lens 280, followed by a beam splitter 290 through which this detection path reaches the shared camera 500 through a converging lens 300. The first detection path encompasses, following microlens array 60, a lens 250 and a mirror 260 that deflects this detection path 90° onto beam splitter 290, by way of which, passing through converging lens 300, it reaches the shared camera 500 in which it is imaged onto the same sensor alongside the second detection path. Beam splitters 240 and 290 either can act in spectrally neutral fashion or can be configured as dichroic short- or longpass filters or as bandpass filters. Alternatively, it is possible to embody beam splitters 240 and 290 as movable hinged mirrors that direct the light onto camera 500 either via lenses 40 and 250 and microlens array 60, or via lenses 210 and 290. In this case the images through the two partial beam paths are always directed onto the same region of the sensor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light sheet microscope for simultaneous imaging of several object planes in a sample illuminated by a light sheet, the light sheet microscope comprising:
   a camera;
   a detection optic defining a detection light beam between the light sheet and the camera, the object planes being arranged around the focal plane of the detection optic and the light sheet extending from a side of the sample and across the focal and object planes; and
   a microlens array configured to provide for the simultaneous imaging of the object planes illuminated by the light sheet.

2. The light sheet microscope according to claim 1, wherein the microlens array includes microlenses of the same focal length or microlenses of different focal lengths, the centers of the microlenses of the microlens array being arranged on a rectangular or square grid, or on a hexagonal grid.

3. The light sheet microscope according to claim 1, wherein the microlens array is arranged in an image plane of a tube lens, or wherein the microlens array is arranged at a point in the detection optic at which an image sensor would be positioned for conventional image acquisition.

4. The light sheet microscope according to claim 1, wherein the microlens array is arranged such that the microlens array images a (virtual) image of a tube lens onto a sensor.

5. The light sheet microscope according to claim 1, wherein the detection optic and a reconstruction algorithm are designed and coordinated with one another in such a way that, for an illumination beam having a full width at half maximum (FWHM) depth of focus of approximately 300 µm (corresponding to a numerical aperture 0.06), images of three planes at a spacing of 2µm, or images of five planes with a spacing of 1 µm, are generated by the camera.

6. The light sheet microscope according to claim 1, wherein the detection optic and a reconstruction algorithm are designed and coordinated with one another in such a way that for an illumination beam having a full width at half maximum (FWHM) depth of focus of approximately 300 µm (corresponding to a numerical aperture 0.06), between four and 10 individual images having a depth of focus from 0.4 to 1 µm are generated by the camera over a FWHM thickness region of 4 µm to 10 µm.

7. The light sheet microscope according to claim 1, further comprising an illumination beam exhibiting a Gaussian profile, the light sheet microscope being configured to homogenize the Gaussian profile of the illumination beam in such a way that all the object planes to be imaged are illuminated with substantially the same light intensity.

8. The light sheet microscope according to claim 7, wherein, for the homogenizing of the Gaussian profile, a beam-shaping optical element, arranged in the illumination beam path, is designed to impart to the illumination beam a top-hat profile whose width is selected in such a way that all the object planes to be imaged are illuminated with substantially the same light intensity.

9. The light sheet microscope according to claim 7, wherein, for the homogenizing of the Gaussian profile, an optical element arranged in the illumination beam path briefly displaces the illumination beam axially in such a way that all the object planes to be imaged are illuminated with substantially the same light intensity.

10. The light sheet microscope according to claim 1, further comprising an illumination beam exhibiting a Bessel profile or a Bessel-like profile, a ring structure of the illumination beam profile being adapted to the detection optic in such a way that each ring of the ring structure illuminates a different object plane.

11. The light sheet microscope according to claim 10, wherein the light beam profile generates a stripe pattern.

12. The light sheet microscope according to claim 1, further comprising a Mathieu illumination beam whose angular spectrum is made up of two oppositely located ring segments arranged symmetrically around a beam origin, an orientation of the ring segments being selected in such a way that a stripe pattern forms along a detection axis in a region around an optical axis of the illumination beam.

13. The light sheet microscope according to claim 1, wherein an element shifts an illumination beam in a beam direction at high frequency over a distance that corresponds at maximum to an image field dimension being provided in order to homogenize the beam profile.

14. The light sheet microscope according to claim 1, further comprising a post-processing device configured to generate images of the object planes.

15. The light sheet microscope according to claim 1, wherein a region of the depth of focus of the detection optic is illuminated by the light sheet that is thinner than the depth of focus of the detection optic.

16. The light sheet microscope according to claim 15, further comprising a light sheet generator configured to generate the light sheet which is arranged in front of an illumination optic in order to move the light sheet, continuously or in steps, along the detection axis of the detection optic into mutually offset positions in such a way that selectably the focal plane and the respective object plane are successively illuminated.

17. The light sheet microscope according to claim 1, further comprising a beam splitter configuration including a beam splitter and being configured to split a path of the detection beam into a detection path leading to the camera via the microlens array and a detection path that leads to a camera without interposition of a microlens array.

18. The light sheet microscope according to claim 17, the beam splitter configuration being designed, using mirrors, in such a way that the detection path having the microlens array, as well as the detection path without interposition of a microlens array, are both imaged next to one another onto the same camera.

19. The light sheet microscope according to claim 1, wherein the microlens array is integrated into the camera and is arranged in a beam path in front of the camera.

20. The light sheet microscope according to claim 1, wherein the light sheet extends perpendicular to the detection light beam.

21. A method for simultaneous imaging of several object planes in a sample illuminated by a light sheet a light sheet microscope, the method comprising:

providing the light sheet microscope comprising:
  a camera;
  a detection optic defining a detection light beam between the light sheet and the camera, the object planes being arranged around the focal plane of the detection optic; and
  a microlens array configured to provide for the simultaneous imaging of the object planes illuminated by the light sheet, generating the light sheet extending from a side of the sample and across the focal and object planes, and detecting and imaging object volumes of the light sheet structure correspondingly in layered fashion.

22. The method according to claim 21, wherein the object volumes are imaged onto the camera successively in time by moving the detected object planes relative to the object.

23. The method according to claim 21, wherein the object volumes are detected and imaged synchronously by simultaneously detecting several illuminated object planes that are farther apart from one another than would be necessary, at an effective depth of focus of the detection optic, in order to scan along the detection axis in accordance with the Nyquist theorem.

24. The method according to claim 21, wherein, in order to image large object volumes, an image stack is detected and imaged in such a way that the object is displaced, relative to the focal plane of the detection optic and of the microlens array, in steps that permit Nyquist sampling but are smaller than a spacing of the object planes detected in one step for one position.

* * * * *